US012764105B2

(12) United States Patent
Krishnan et al.

(10) Patent No.: US 12,764,105 B2
(45) Date of Patent: Oct. 13, 2026

(54) BATCH NETWORK CONFIGURATION OF BUILDING CONTROL DEVICES FOR A BUILDING CONTROL NETWORK

(71) Applicant: Honeywell International Inc., Charlotte, NC (US)

(72) Inventors: Ravi Bharathi Krishnan, Bangalore (IN); Shyamsundhar Madhusudhan, Chennai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 14 days.

(21) Appl. No.: 18/793,384

(22) Filed: Aug. 2, 2024

(65) Prior Publication Data

US 2025/0063039 A1 Feb. 20, 2025

(30) Foreign Application Priority Data

Aug. 16, 2023 (IN) ............................ 202311054849

(51) Int. Cl.
*H04L 9/40* (2022.01)

(52) U.S. Cl.
CPC ................................ *H04L 63/0823* (2013.01)

(58) Field of Classification Search
CPC .................................................. H04L 63/0823
See application file for complete search history.

(56) References Cited

U.S. PATENT DOCUMENTS 7,082,464 B2 7/2006 Hasan et al.
7,096,164 B1 8/2006 Musharbash
(Continued)

FOREIGN PATENT DOCUMENTS

AU 2011235937 A1 6/2012
CA 2703206 A1 4/2009
(Continued)

OTHER PUBLICATIONS

"How to distribute Active Directory user certificates with Workspace ONE UEM," Orange Business, available online at https://pprod-cloud.orange-business.com/nl/blogpost-nl/how-to-distribute-active-directory-user-certificates-with-workspace-one-uem/, retrieved on Aug. 1, 2023, 12 pages.
(Continued)

*Primary Examiner* — Sangseok Park
(74) *Attorney, Agent, or Firm* — Seager, Tufte & Wickhem, LLP

(57) ABSTRACT

Batch configuration of digital certificates for building control devices that operate on a secure building control network using Certificate Based Authentication (CBA). A plurality of digital certificate files may be stored, wherein each of the digital certificate files includes a digital certificate and has a file name that includes a pattern that can be matched to a unique identifier of a respective one of the building control devices. A matching one of the digital certificate files may be automatically identified for each of the building control devices by matching the pattern in the file name of the matching digital certificate file with the unique identifier of the respective building control device. The matching digital certificate file may be batch uploaded to the respective building control device for subsequent use by the respective building control device when communicating over the building control network.

15 Claims, 8 Drawing Sheets

(56) References Cited

U.S. PATENT DOCUMENTS

| | | | |
|---|---|---|---|
| 7,103,648 | B1 | 9/2006 | Burrows |
| 7,308,323 | B2 | 12/2007 | Kruk et al. |
| 7,334,216 | B2 | 2/2008 | Molina-Moreno et al. |
| 7,356,011 | B1 | 4/2008 | Waters et al. |
| 7,567,844 | B2 | 7/2009 | Thomas et al. |
| 7,634,555 | B1 | 12/2009 | Wainscott et al. |
| 7,730,223 | B1 | 6/2010 | Bavor et al. |
| 8,521,708 | B2 | 8/2013 | Ahmed et al. |
| 8,830,267 | B2 | 9/2014 | Brackney |
| 8,930,214 | B2 | 1/2015 | Woolford |
| 9,009,585 | B1 | 4/2015 | Chetrit et al. |
| 9,294,468 | B1 | 3/2016 | Kilbourn |
| 9,323,055 | B2 | 4/2016 | Baillot |
| 9,342,928 | B2 | 5/2016 | Rasane et al. |
| 9,571,986 | B2 | 2/2017 | Gottschalk et al. |
| 9,769,151 | B2 | 9/2017 | Klieman et al. |
| 10,278,048 | B2 | 4/2019 | Sharma et al. |
| 10,402,358 | B2 | 9/2019 | Sorenson et al. |
| 11,677,759 | B1 * | 6/2023 | Overcash .............. H04L 63/101 726/26 |
| 2002/0049693 | A1 | 4/2002 | Gase |
| 2002/0161867 | A1 | 10/2002 | Cochran et al. |
| 2003/0078798 | A1 | 4/2003 | Zaks et al. |
| 2003/0177205 | A1 | 9/2003 | Liang et al. |
| 2004/0133689 | A1 | 7/2004 | Vasisht |
| 2004/0250236 | A1 | 12/2004 | O'Malley et al. |
| 2005/0149753 | A1 | 7/2005 | Cromer et al. |
| 2005/0216580 | A1 | 9/2005 | Raji et al. |
| 2006/0044307 | A1 | 3/2006 | Song |
| 2006/0055704 | A1 | 3/2006 | Kruk et al. |
| 2006/0058900 | A1 | 3/2006 | Johanson et al. |
| 2006/0058923 | A1 | 3/2006 | Kruk et al. |
| 2006/0079999 | A1 | 4/2006 | Husein |
| 2006/0112073 | A1 | 5/2006 | Jensen et al. |
| 2006/0242272 | A1 | 10/2006 | Furukawa |
| 2007/0097992 | A1 | 5/2007 | Singh et al. |
| 2009/0164668 | A1 | 6/2009 | Duckett |
| 2009/0320110 | A1 * | 12/2009 | Nicolson ............... H04L 9/3268 713/176 |
| 2011/0115816 | A1 | 5/2011 | Brackney |
| 2011/0246630 | A1 | 10/2011 | Deutsch et al. |
| 2012/0131197 | A1 | 5/2012 | Prentice et al. |
| 2013/0031202 | A1 | 1/2013 | Mick et al. |
| 2013/0069985 | A1 | 3/2013 | Wong et al. |
| 2013/0169681 | A1 | 7/2013 | Rasane et al. |
| 2013/0173548 | A1 * | 7/2013 | Haustein ............. G06F 11/1458 707/638 |
| 2013/0212453 | A1 | 8/2013 | Gudai et al. |
| 2013/0290706 | A1 | 10/2013 | Socky et al. |
| 2014/0282257 | A1 | 9/2014 | Nixon et al. |
| 2015/0062164 | A1 | 3/2015 | Kobayashi et al. |
| 2015/0097706 | A1 | 4/2015 | Perger et al. |
| 2015/0120000 | A1 | 4/2015 | Coffey et al. |
| 2015/0188775 | A1 | 7/2015 | Van et al. |
| 2015/0222604 | A1 | 8/2015 | Ylonen |
| 2015/0310664 | A1 | 10/2015 | Boussard et al. |
| 2015/0341390 | A1 | 11/2015 | Kiefer et al. |
| 2016/0006607 | A1 * | 1/2016 | Wang .................. H04L 41/0886 709/222 |
| 2016/0019212 | A1 | 1/2016 | Soldani |
| 2016/0042568 | A1 | 2/2016 | Farnham et al. |
| 2016/0095188 | A1 | 3/2016 | Verberkt et al. |
| 2016/0099832 | A1 | 4/2016 | Alshinnawi et al. |
| 2016/0212831 | A1 | 7/2016 | Dobai et al. |
| 2016/0224208 | A1 | 8/2016 | Bugajski et al. |
| 2016/0313902 | A1 | 10/2016 | Hill et al. |
| 2017/0005344 | A1 | 1/2017 | Schmid et al. |
| 2017/0018120 | A1 | 1/2017 | Li et al. |
| 2017/0019979 | A1 | 1/2017 | Ghanoun et al. |
| 2017/0021339 | A1 | 1/2017 | Na et al. |
| 2017/0053441 | A1 | 2/2017 | Nadumane et al. |
| 2017/0091607 | A1 | 3/2017 | Emeis et al. |
| 2017/0195162 | A1 | 7/2017 | Enrique Salpico |
| 2017/0213390 | A1 | 7/2017 | Ramachandran et al. |
| 2017/0237608 | A1 | 8/2017 | Wu et al. |
| 2018/0012173 | A1 | 1/2018 | Leen et al. |
| 2018/0034923 | A1 | 2/2018 | Mendonca et al. |
| 2018/0129276 | A1 | 5/2018 | Nguyen et al. |
| 2018/0157321 | A1 | 6/2018 | Liu |
| 2018/0218538 | A1 | 8/2018 | Short et al. |
| 2018/0218540 | A1 | 8/2018 | Sridharan et al. |
| 2018/0262349 | A1 | 9/2018 | Ranjan et al. |
| 2018/0323977 | A1 | 11/2018 | Hojsik et al. |
| 2018/0337822 | A1 | 11/2018 | Heimes et al. |
| 2018/0375823 | A1 | 12/2018 | Nalukurthy et al. |
| 2019/0058627 | A1 | 2/2019 | Collins et al. |
| 2019/0186779 | A1 | 6/2019 | Janakiraman et al. |
| 2019/0268472 | A1 | 8/2019 | Amir et al. |
| 2019/0355177 | A1 | 11/2019 | Manickam et al. |
| 2020/0019287 | A1 | 1/2020 | Sahai et al. |
| 2020/0162503 | A1 | 5/2020 | Shurtleff et al. |
| 2020/0278127 | A1 | 9/2020 | Park et al. |
| 2021/0176123 | A1 | 6/2021 | Plamondon et al. |
| 2021/0247731 | A1 * | 8/2021 | Poluri ................... G06T 19/006 |
| 2021/0373929 | A1 | 12/2021 | He |
| 2023/0010215 | A1 | 1/2023 | Bliss et al. |
| 2023/0082348 | A1 | 3/2023 | Bhadriraju et al. |
| 2023/0103456 | A1 * | 4/2023 | Haque ................... H04L 63/062 713/156 |
| 2025/0056228 | A1 * | 2/2025 | Tian .................... H04L 63/0823 |
| 2025/0317734 | A1 * | 10/2025 | Shalom ................. H04W 76/10 |

FOREIGN PATENT DOCUMENTS

| | | | |
|---|---|---|---|
| CN | 110140096 | A | 8/2019 |
| CN | 113131588 | A | 7/2021 |
| EP | 1584158 | B1 | 4/2012 |
| EP | 3042544 | A1 | 7/2016 |
| GB | 2397202 | A | 7/2004 |
| WO | 2008/144804 | A1 | 12/2008 |
| WO | 2017/192752 | A1 | 11/2017 |
| WO | 2018/106543 | A1 | 6/2018 |
| WO | 2019/241772 | A1 | 12/2019 |

OTHER PUBLICATIONS

"Regular expression syntax cheat sheet Java Script MDN", mdn web docs, available online at https://developer.mozilla.org/en-US/docs/Web/JavaScript/Guide/Regular_expressions/Cheatsheet, retrieved on Aug. 1, 2023, 12 pages.

Akin, et al., "Linking Building Commissioning and Operations and Maintenance Towards an Embedded Commissioning Practice", Proceedings of the Fifth International Conference for Enhanced Building Operations, Pittsburgh, Pennsylvania, Oct. 11-13, 2005, 10 pages.

Amazon Web Services, Inc., "AWS Certificate Manager FAQ's," 15 pages, 2016.

Amazon Web Services, Inc., "AWS Certificate Manager," Downloadable at https://aws.amazon.com/certificate-manager/, 6 pages, 2016.

Axis communications unveils new device manager. (2018). Wireless News, , NA. Retrieved from https ://dialog . proquest.com/professional/docview /2002150801 ?accountid =131444 (Year: 2018).

AXIS Communications, "How to Assign an IP Address and Access your Device," Reference/User Manual, 2020, 10 pages.

AXIS Communications. Security Control with AXIS Device Manager, 2019. (Year: 2019).

AXIS Device Manager- Configuration Tip Video Screen Shots (Video Dated Feb. 1, 2018), available online at <https://www.youtube.com/watch?v=gt7GaO9HN8s>.

Bernard, Ray, P.S.P., C. H .S.-1., 11. (Feb. 2018). How to manage high-camera-count deployments. Security Technology Executive, 28, 8-9. Retrieved from https://dialog.proquest .com/professional/docview/2015779864?accountid=131444 (Year: 2018).

Busker, "Task Specific Information Visualizations Using Head-Mounted Display Technology", http://essay.utwente.nl/69492/1/Busker,%20B.%200166944%20_%20openbaar.pdf, Apr. 2016, 31 pages. [Secured Download Only].

European Extended Search Report, EP Application No. 21153879.8, dated Jun. 28, 2021 (10 pages).

(56) References Cited

OTHER PUBLICATIONS

Extended European Search Report, EP Application No. 21183348.8, dated Dec. 9, 2021 (7 pages).
Fiorentino, et al. "Augmented reality on large screen for interactive maintenance instructions", Computers in Industry, 2014, 18 pages.
Hakkarainen, et al., "Mobile Augmented Reality for Building and Construction", International AR Standards Workshop, Oct. 2010, 3 pages.
https://www.ibm.com/support/knowledgecenter/SSLTBW_2.1.0/com.IBM.zos.v2r1.icha700/toc.htm, "Summary of Steps for Defining a RACF Group," z/OS Security Adminstrator's Guide, 2 pages, 2014.
Lee, et al., "The Development of an Augmented Reality-Based Data Visualization System for Commissioning of Air Handling Units", 7th International Conference on Construction Applications of Virtual Reality, Oct. 2007, 10 pages.
Lee, et al., "The Development of an Augmented Reality-Based User Interface To Support Maintenance Fieldwork", Embodying Virtual Architecture: The Third International Conference of the Arab Society for Computer Aided Architectural Design (ASCAAD 2007), Nov. 2007, 8 pages.
Lee, et al., "The Virtual-Augmented-Reality Environment for Building Commission: Case Study", Proceedings of the Fifth International Conferene for Enhanced Builidng Operations, Pittsburgh, Pennsylvania, Oct. 2005, 6 pages.
Parmar, "Addressing IP Security Concerns when Deploying a BACnet System," BACnet International, AHR Expo, Jan. 22-24, 2018, 40 pages.
PCT/US2018/065970 Search Report and Written Opinion, pp. 13, Mar. 22, 2019.
ProVisionaire Amp Editor Setup Guide {downloaded Sep. 15, 2021).
Schneider Electric, "User Assistance for StruxureWare Data Center Expert (DCE)7.2.2," 3 pages, 2014.
Sun Microsystems, Inc., "iPlanet Certificate Management System Installation and Setup Guide," Chapter 1, 30 pages, Oct. 7, 2002.
Tridium, "Open Integrated Solutions, Automation with the Niagara Framework," 16 pages, 2013.
Wang, Mingyu, and Dong Yang. "IPV6 Address Assignment and Management Mechanism for Hetero geneous Industrial Networks." 2021 IEEE 5th Advanced Information Technology, Electronic and Automation Control Conference (IAEAC). vol. 5. IEEE, 2021. (Year: 2021).
Wikipedia, "Real-time operating system", available online at: <https://en.wikipedia.org/wiki/Real-time_operating_system>, Sep. 25, 2024, 6 pages.

* cited by examiner

BATCH NETWORK CONFIGURATION OF BUILDING CONTROL DEVICES FOR A BUILDING CONTROL NETWORK

The present application claims priority to India Provisional Application No. 202311054849, filed on Aug. 16, 2023, entitled "BATCH NETWORK CONFIGURATION OF BUILDING CONTROL DEVICES FOR A BUILDING CONTROL NETWORK", which is incorporated herein by reference.

TECHNICAL FIELD

The present disclosure relates to methods and systems for configuring building control devices and more particularly to methods and systems for batch configuration of digital certificates for building control devices that are to operate on a secure building control network that uses Certificate Based Authentication (CBA).

BACKGROUND

Building control systems such as security systems, fire safety systems, lighting systems and HVAC (Heating, Ventilating and Air Conditioning) systems can include a large number of building control devices that need to be connected to a building control network in order for the building control system to function as intended. In many cases, each building control device must be individually configured by a technician to bring the building control device on-line on the building control network. This can include configuring appropriate digital certificates for each of the building control devices so that the building control devices can securely connect to a secure building control network that uses Certificate Based Authentication (CBA). This can be a time consuming and tedious process, especially when a large number of building control devices are involved. What would be desirable are methods and systems for batch network configuration of building control devices.

SUMMARY

The present disclosure relates to methods and systems for configuring building control devices and more particularly to methods and systems for batch configuration of digital certificates for building control devices that are to operate on a secure building control network that uses Certificate Based Authentication (CBA). An example may be found in a method for performing a batch network configuring of a plurality of building control devices for a building control network. The illustrative method includes storing a plurality of digital certificate files, wherein each of the digital certificate files includes a digital certificate and has a file name that includes a pattern that can be matched to a unique identifier of a respective one of the plurality of building control devices. A matching one of the plurality of digital certificate files is automatically identified for each of the plurality of building control devices by matching the pattern in the file name of the matching digital certificate file with the unique identifier of the respective one of the plurality of building control devices. The matching ones of the plurality of digital certificate files are batch uploaded to the respective one of the plurality of building control devices for subsequent use by the respective one of the plurality of building control devices when communicating over the building control network. The building control network may be a secure building control network that uses Certificate Based Authentication (CBA). In some cases, the matching ones of the plurality of digital certificate files are encrypted (e.g. using a password), with the encrypted digital certificate files saved locally, and then batch uploaded to the respective one of the plurality of building control devices for subsequent use by the respective one of the plurality of building control devices when communicating over the building control network.

Another example may be found in a configuration tool for performing a batch network configuring of a plurality of building control devices for a building control network. The configuration tool includes an IP (Internet Protocol) port and a memory for storing a plurality of digital certificate files, wherein each of the digital certificate files includes a digital certificate and has a file name that includes a pattern that can be matched to a unique identifier of a respective one of the plurality of building control devices. A configuration tool controller is operatively coupled to the memory and the IP port. The configuration tool controller is configured to automatically identify a matching one of the plurality of digital certificate files for each of the plurality of building control devices by matching the pattern in the file name of the matching digital certificate file with the unique identifier of the respective one of the plurality of building control devices. The configuration tool controller is configured to upload the matching ones of the plurality of digital certificate files to the respective one of the plurality of building control devices via the IP port for subsequent use by the respective one of the plurality of building control devices when communicating over the building control network.

In some cases, the configuration tool may be operatively coupled to a Building Management System (BMS) Supervisor, and the BMS Supervisor is operatively coupled to the building control network. When so provided, the configuration tool works through and/or with the BMS Supervisor to store a plurality of digital certificate files, automatically identify a matching one of the plurality of digital certificate files for each of the plurality of building control devices by matching the pattern in the file name of the matching digital certificate file with the unique identifier of the respective one of the plurality of building control devices, encrypt the matching digital certificate files, save the encrypted digital certificate files locally, and upload the encrypted matching digital certificate files to the respective one of the plurality of building control devices for subsequent use by the respective one of the plurality of building control devices when communicating over the building control network.

In another example, the configuration tool may be operatively coupled to a Plant Controller, and the Plant Controller is operatively coupled to the building control network. When so provided, the configuration tool works through and/or with the Plant Controller to store a plurality of digital certificate files, automatically identify a matching one of the plurality of digital certificate files for each of the plurality of building control devices by matching the pattern in the file name of the matching digital certificate file with the unique identifier of the respective one of the plurality of building control devices, encrypting the matching digital certificate files, saving the encrypted digital certificate files locally, and uploading the encrypted matching digital certificate files to the respective one of the plurality of building control devices for subsequent use by the respective one of the plurality of building control devices when communicating over the building control network. These are just some examples.

Another example may be found in a method for batch configuration of digital certificates for building control devices that are to operate on a secure building control network that uses Certificate Based Authentication (CBA). The illustrative method includes securely storing a plurality of digital certificate files, wherein each of the digital certificate files includes a digital certificate and has a unique identifier that can be matched to a unique identifier of a respective one of the plurality of building control devices. A matching one of the plurality of digital certificate files is automatically identified for each of the plurality of building control devices by matching the unique identifier of the matching digital certificate file with the unique identifier of the respective one of the plurality of building control devices. The matching ones of the plurality of digital certificate files are uploaded to the respective one of the plurality of building control devices for subsequent use by the respective one of the plurality of building control devices when communicating over the building control network.

One or more additional network configuration parameters may be uploaded to one or more of the plurality of building control devices for subsequent use by the one or more of the plurality of building control devices when communicating over the building control network, wherein the one or more additional network configuration parameters include one or more of an SSID, a username, a password and a root certificate.

In some cases, the configuration tool may be configured to give the user an option to select a particular digital certificate from a plurality or pre-stored digital certificates, and upload the selected digital certificates to a selected one of the building control devices. This can be done separately from, or in addition to, the batch configuration discussed herein.

In some cases, the configuration tool is configured to give the user an option to read back the network configuration parameters from one or more of the building control devices and store them securely. This may allow a user to, for example, subsequently use a different network configuration tool and restore the previously stored network configuration parameters into the new configuration tool. This may also allow a user of the configuration tool to quickly reconfigure building control devices on a building control network, particularly when the configuration of the building control network has been corrupted and/or one or more components have been replaced. The network configuration parameters that are stored can include, for example, the network SSID, the network password, the digital certificates associated with each of the building control devices, and/or any other network configuration parameters associated with the building control network.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1A:
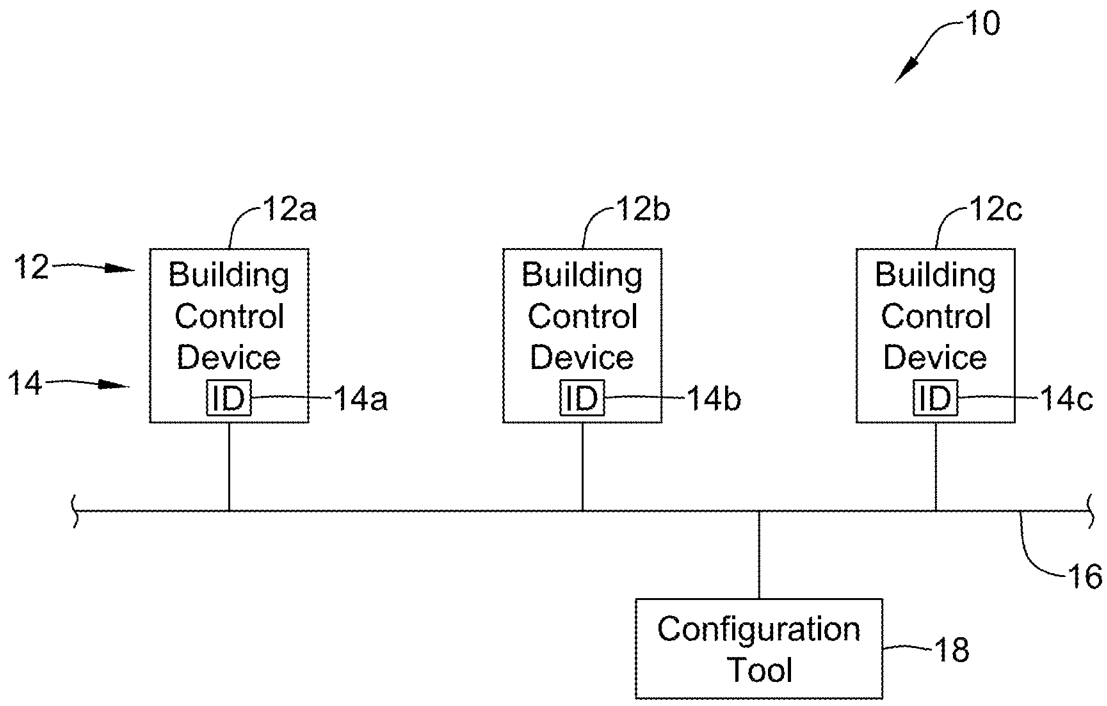
FIG. 1A is a schematic block diagram showing an illustrative building control system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1A is a schematic block diagram showing an illustrative building control system 10. The illustrative building control system 10 may generically represent any of a variety of different building control systems, such as but not limited to a security system, an intrusion detection system, a fire system, a lighting system, a Heating, Ventilating and Air Conditioning (HVAC) system, and/or any other suitable building control system. The building control system 10 may include a number of building control devices 12, individually labeled as 12*a*, 12*b* and 12*c*. While a total of three building control devices 12 are shown, this is merely illustrative, as the building control system 10 may include any number of building control devices 12, and in some instances may include considerably more than three building control devices 12. Each of the building control devices 12 may include a unique ID 14, individually labeled as 14*a*, 14*b* and 14*c*. The unique ID may uniquely identify the corresponding building device, and may include, for example, one or more of a device name, a device serial number, a device instances, a device MAC address, and/or any other suitable unique ID. These are just examples.

Depending on what the building control system 10 is, the building control devices 12 may each represent any of a variety of different components such as actuators, controllers, sensor, etc. In this example, each of the building control devices 12 is operatively coupled with a building control network 16. The building control network 16 may represent a wired network. In some instances, the building control network 16 or portions thereof may represent a wireless network, communicating over any of a variety of different wireless communication protocols. In some instances, a configuration tool 18 may also be operatively coupled to the building control network 16. The configuration tool 18 may be used in performing batch network configuration of the building control devices 12.

Figure 1B:
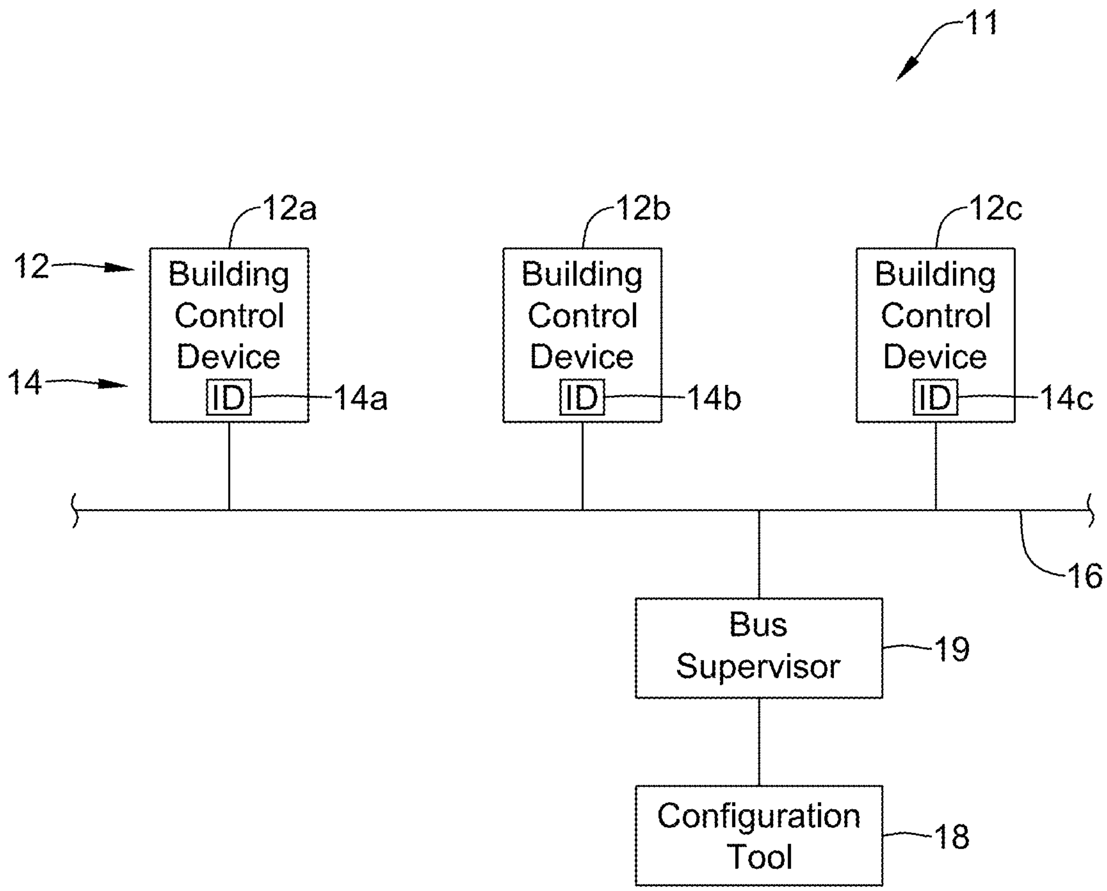
FIG. 1B is a schematic block diagram showing another illustrative building control system.

FIG. 1B is a schematic block diagram showing another illustrative building control system 11. Illustrative building control system 11 is the same as building control system 10 of FIG. 1A except the configuration tool 18 is operatively coupled to a Building Management System (BMS) Supervisor 19, and the BMS Supervisor 19 is operatively coupled to the building control network 16. When so provided, the configuration tool 18 works through and/or with the BMS Supervisor 19 to, for example, perform batch network configuration of the building control devices 12. In some cases, the configuration tool 18 works through and/or with the BMS Supervisor 19 to store a plurality of digital certificate files, automatically identify a matching one of the plurality of digital certificate files for each of the plurality of building control devices by matching a pattern in the file name of the matching digital certificate file with a unique identifier of the respective one of the plurality of building control devices, encrypt the matching digital certificate files, save the encrypted digital certificate files locally, and upload the encrypted matching digital certificate files to the respective one of the plurality of building control devices for subsequent use by the respective one of the plurality of building control devices when communicating over the building control network 16.

Figure 1C:
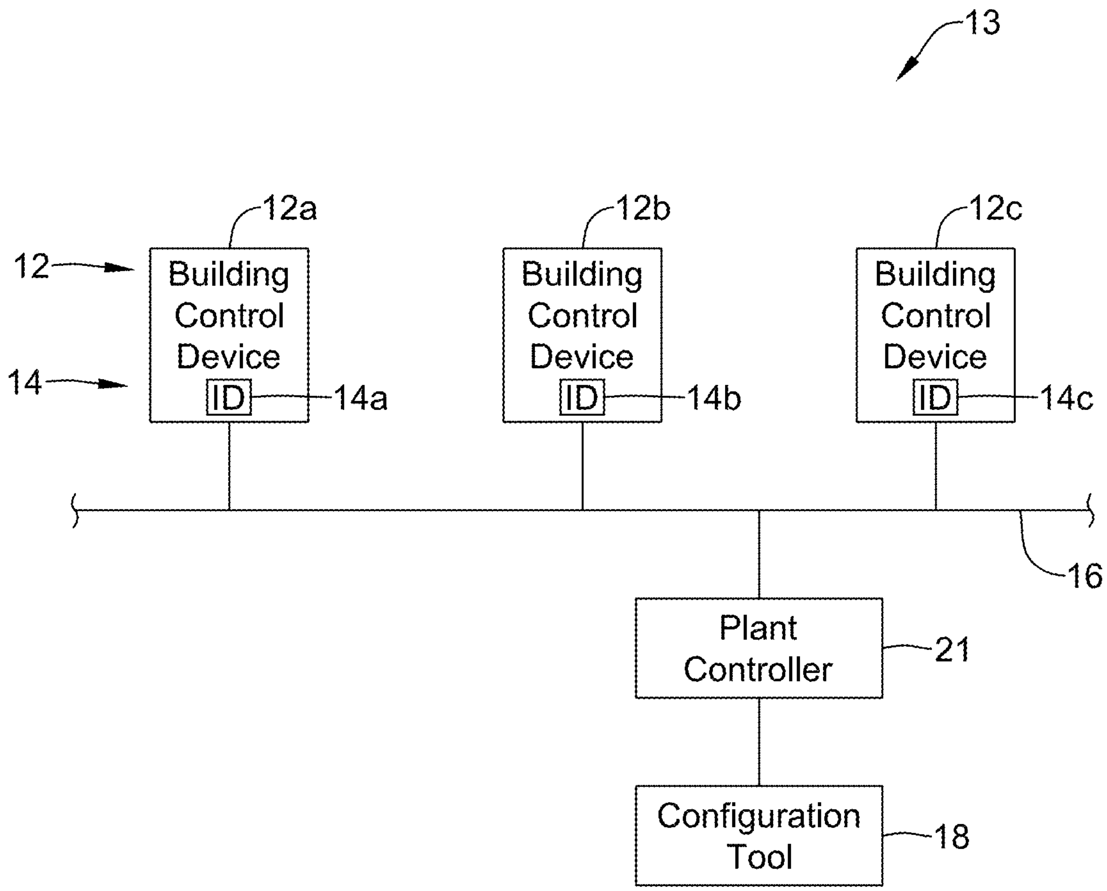
FIG. 1C is a schematic block diagram showing yet another illustrative building control system.

FIG. 1C is a schematic block diagram showing another illustrative building control system 13. Illustrative building control system 13 is the same as building control system 10 of FIG. 1A except the configuration tool 18 is operatively coupled to a Plant Controller 21, and Plant Controller 21 is operatively coupled to the building control network 16. When so provided, the configuration tool 18 works through and/or with the Plant Controller 21 to, for example, perform batch network configuration of the building control devices 12. In some cases, the configuration tool 18 works through and/or with the Plant Controller 21 to, for example, store a plurality of digital certificate files, automatically identify a matching one of the plurality of digital certificate files for each of the plurality of building control devices by matching the pattern in the file name of the matching digital certificate file with the unique identifier of the respective one of the plurality of building control devices, encrypt the matching digital certificate files, save the encrypted digital certificate files locally, and upload the encrypted matching digital certificate files to the respective one of the plurality of building control devices for subsequent use by the respective one of the plurality of building control devices when communicating over the building control network 16.

Figure 2:
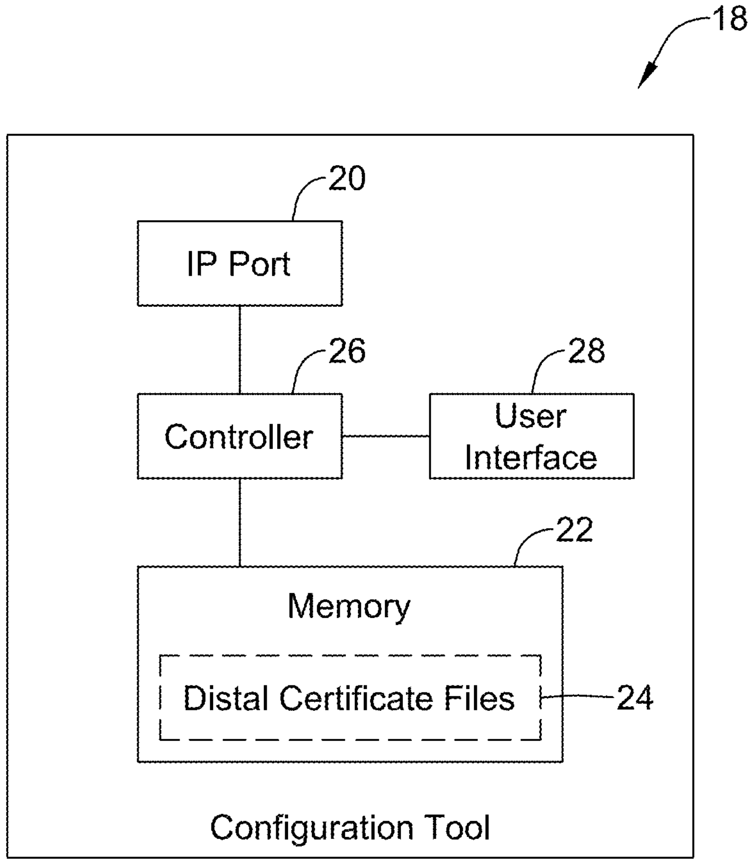
FIG. 2 is a schematic block diagram showing an illustrative configuration tool.

FIG. 2 is a schematic block diagram showing the illustrative configuration tool 18. The illustrative configuration tool 18 includes an IP (Internet Protocol) port 20. The IP port 20 may allow the configuration tool 18 to receive information from the building control network 16 as well as allow the configuration tool 18 to transmit information on the building control network 16, such as transmitting configuration information to the building control devices 12. In some cases, the configuration tool 18 may work through and/or with a BMS Supervisor 19, Plant Controller 21 and/or some other device or devices. In the example shown, the configuration tool 18 includes a memory 22 for storing a plurality of digital certificate files 24. Each digital certificate file 24 may include a digital certificate, and a file name that includes a pattern (e.g. pattern of characters making up all or part of the file name) that can be matched to a unique identifier (the ID 14) of a respective one of the plurality of building control devices 12.

A configuration tool controller 26 is operatively coupled to the memory 22 and to the IP port 20. The configuration tool controller 26 is configured to automatically identify a matching one of the plurality of digital certificate files 24 for each of the plurality of building control devices 12 by matching the pattern in the file name of the matching digital certificate file with the unique identifier (ID 14) of the respective one of the plurality of building control devices 12. The configuration tool controller 26 is configured to upload the matching ones of the plurality of digital certificate files 24 to the respective one of the plurality of building control devices via the IP port 20 for subsequent use by the respective one of the plurality of building control devices 12 when communicating over the building control network 16. In some cases, the configuration tool controller 26 encrypts the matching ones of the plurality of digital certificate files 24, stores the encrypted digital certificate files locally, such as in a local computer or a plant controller, before uploading the encrypted matching ones of the plurality of digital certificate files 24 to the respective one of the plurality of building control devices.

In some instances, the configuration tool 18 may further include a user interface 28. The configuration tool controller 26 may be configured to display on the user interface 28 an association (e.g. mapping) between each of the plurality of building control devices 12 and the corresponding matching digital certificate file 24. In some cases, the associating may be displayed in the form of a table or the like. In some instances, the configuration tool controller 26 may be configured to receive a selection via the user interface 28 of the plurality of building control devices 12 (perhaps less than all of the available building control devices 12) before automatically identifying a matching one of the plurality of digital certificate files 24 for each of the plurality of building control devices 12.

In some cases, the configuration tool 18 may be configured to give the user an option to select a particular digital certificate from a plurality or pre-stored digital certificates, and upload the selected digital certificates to a selected one of the building control devices. This can be done separately from, or in addition to, the batch configuration discussed herein.

In some instances, the configuration tool 18 may be used to select custom or predefined parameters for matching the digital certificate files with the unique identifier (ID 14) of the respective one of the plurality of building control devices 12. In some cases, the digital certificates stored by the digital certificate files 24 include either a user certificate or a private key for the respective one of the plurality of building control devices 12. In some cases, each of the plurality of building control devices 12 has two or more digital certificate files 24, with one securely storing a corresponding user certificate and one securely storing a corresponding private key. This is just an example.

The configuration tool 18 may obtain and/or update the digital certificates and digital certificate files for each of the building control devices 12 before the configuration tool 18 communicates with the plurality of building control devices 12. That is, in some cases, the digital certificates and digital certificate files for each of the building control devices 12 may pre-obtained and pre-stored before connecting with the building control devices 12.

In some instances, the user may open a window via the user interface 28 of the configuration tool 18 in which all of the building control devices 12 are displayed (sometimes in a single view), and the user may then configure other common network parameters for the building control devices (all or selected ones). The other common network parameters include, for example, security type (e.g. WPA2 Enterprise), WiFi SSID name, EAP Type (e.g. TTL), Username, Password, and a root certificate file location. The user may also select a folder where the certificate files are located. After the user selects the proper folder, the digital certificate files may be accessed and the digital certificates (e.g. user certificates and private keys) stored in the digital certificate files may be automatically assigned to a respective building control device based on the unique IDs 14 of the building control devices and the matching pattern in the file names of the digital certificate files.

In some cases, the user will be able to see the mapping between the building control devices and the matching digital certificate files before the configuration tool 18 writes the digital certificate files to the respective building control devices. If the mapping is approved by the user, the configuration tool 18 may write the digital certificate files to the respective building control devices for use when communicating on the building control network 16. The configuration tool 18 may also write one or more of the other common network parameters to the building control devices (e.g. security type (e.g. WPA2 Enterprise), WiFi SSID name, EAP Type (e.g. TTL), Username, Password, and a root certificate file location).

In some cases, the configuration tool 18 is configured to give the user an option to read back the network configuration parameters from one or more of the building control devices and securely store them locally. This may allow a user to, for example, subsequently use a different network configuration tool and restore the previously stored network configuration parameters into the new configuration tool. This may also allow a user of the configuration tool to quickly reconfigure building control devices on a building control network, particularly when the configuration of the building control network has been corrupted and/or one or more components have been replaced. The network configuration parameters that are stored can include, for example, the network SSID, the network password, the digital certificates associated with each of the building control devices, and/or any other network configuration parameters associated with the building control network. These are just examples.

Figure 3A:
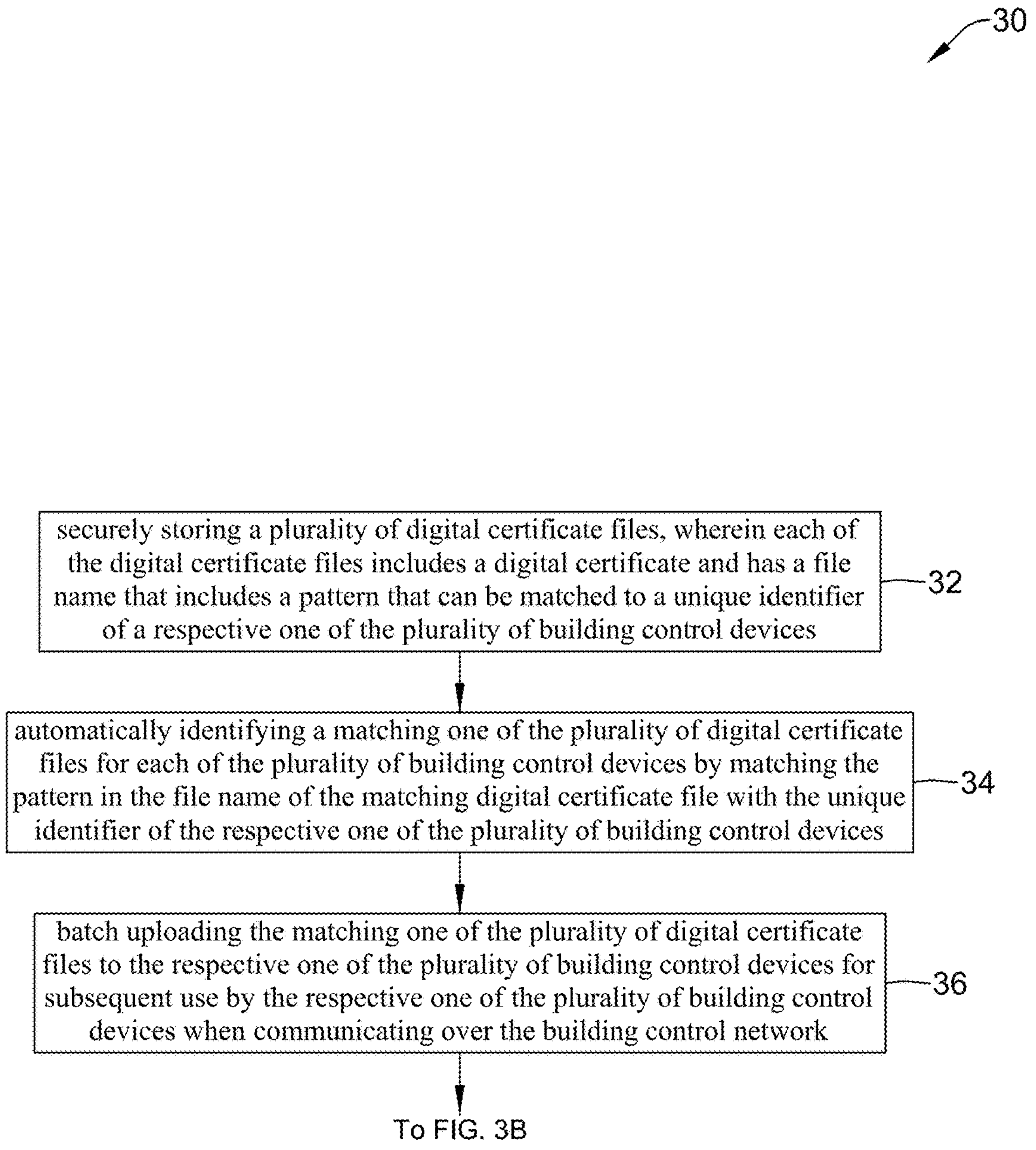
FIGS. 3A and 3B are flow diagrams that together show an illustrative method for performing a batch network configuration of a plurality of building control devices.
Figure 3B:
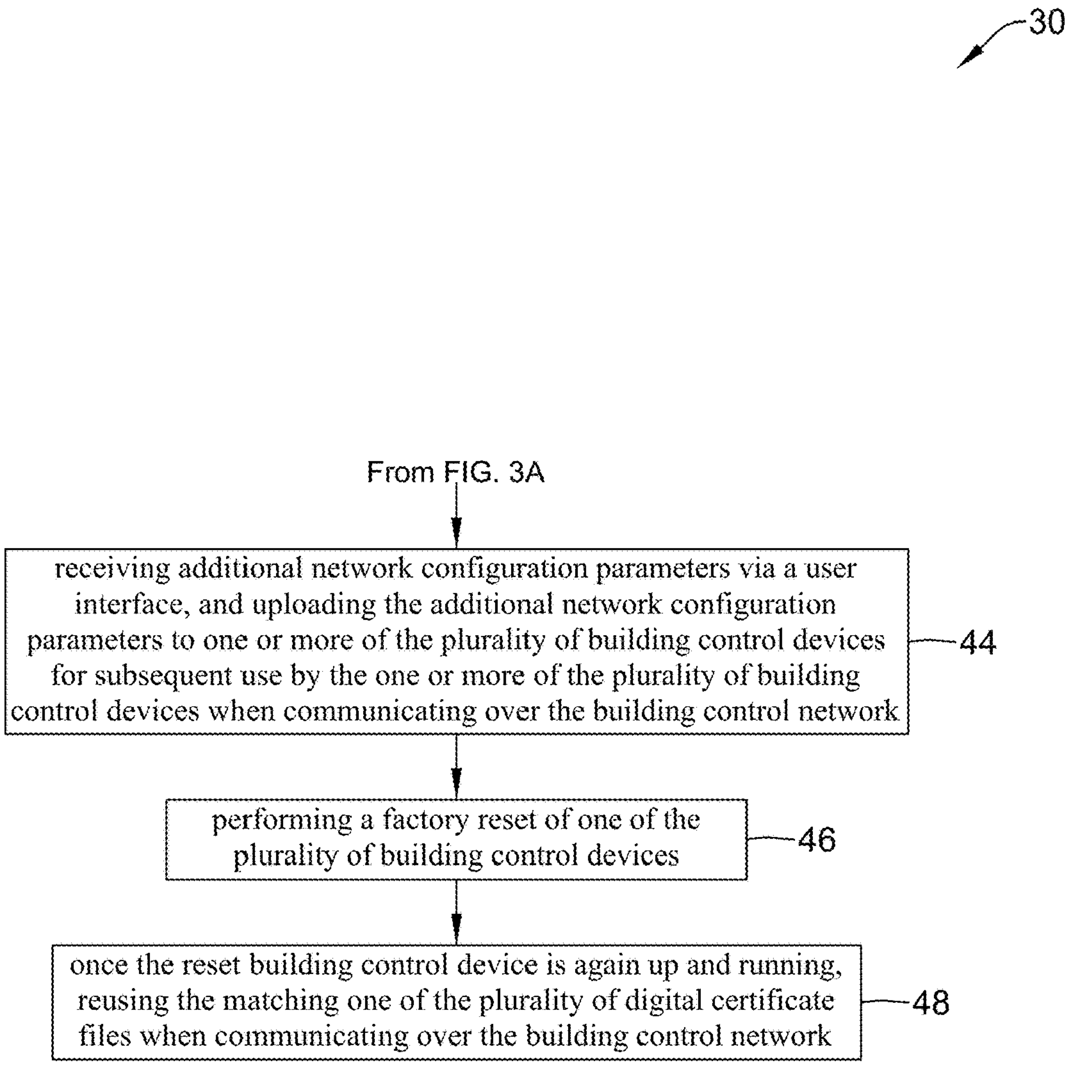

FIGS. 3A and 3B are flow diagrams that together show an illustrative method 30 for performing a batch network configuration of a plurality of building control devices (such as the building control devices 12). The illustrative method 30 includes securely storing a plurality of digital certificate files (such as the digital certificate files 24), wherein each of the digital certificate files includes a digital certificate and has a file name that includes a pattern that can be matched to a unique identifier (such as the ID 14) of a respective one of the plurality of building control devices, as indicated at block 32. In some instances, the digital certificate includes a user certificate. In some instances, the digital certificate includes a private key. In some instances, the unique identifier of the respective one of the plurality of building control devices may include one or more of a device name, a device serial number, a device instance and a device MAC address. In some instances, the plurality of digital certificate files may be generated and pre-stored in a directory before automatically identifying a matching one of the plurality of digital certificate files for each of the plurality of building control devices. In some instances, the plurality of building control devices (perhaps less than all of the available building control devices 12) may be selected via a user interface 28 of the configuration tool 18, but this is not required.

A matching one of the plurality of digital certificate files is automatically identified for each of the plurality of building control devices by matching the pattern in the file name of the matching digital certificate file with the unique identifier of the respective one of the plurality of building control devices, as indicated at block 34. In some instances, the matching pattern in the file name of the matching digital certificate file includes one or more of a device name, a device serial number, a device instance and a device MAC address. The file name of the matching digital certificate file may include additional characters that are in addition to the matching pattern, wherein the additional characters identify a type of digital certificate that is included in the matching digital certificate file (e.g. "user_cert.pem" for identifying a user certificate and/or "ppk.pem" for identifying a private key). In some instances, a custom pattern matching expression may be received from a user, such as in a REGEX format. The custom pattern matching expression may then be used when automatically identifying the matching one of the plurality of digital certificate files for each of the plurality of building control devices.

In some cases, the user interface 28 may display an association between each of the plurality of building control devices 12 and the corresponding matching digital certificate file(s), but this is not required. In some cases, the association may be displayed in a tabular format.

With matching complete, the matching ones of the plurality of digital certificate files are batch uploaded to the respective one of the plurality of building control devices for subsequent use by the respective one of the plurality of building control devices when communicating over the building control network 16, as indicated at block 36. In some instances, batch uploading the matching one of the plurality of digital certificate files to the respective one of the plurality of building control devices may occur when the respective one of the plurality of building control devices has an on-line status on the building control network 16.

Continuing on FIG. 3B, in some instances the method 30 further includes receiving additional network configuration parameters via a user interface, and uploading the additional network configuration parameters to one or more of the plurality of building control devices for subsequent use by the one or more of the plurality of building control devices when communicating over the building control network, as indicated at block 44. In some instances, the additional network configuration parameters may include one or more of security type (e.g. WPA2 Enterprise), WiFi SSID name, EAP Type (e.g. TTL), Username, Password, and a root certificate file location.

In some instances, the method 30 may include performing a factory reset of one of the plurality of building control devices, as indicated at block 46. Once the building control device is again up and running, reusing the matching one of the plurality of digital certificate files when communicating over the building control network, as indicated at block 48.

Figure 4:
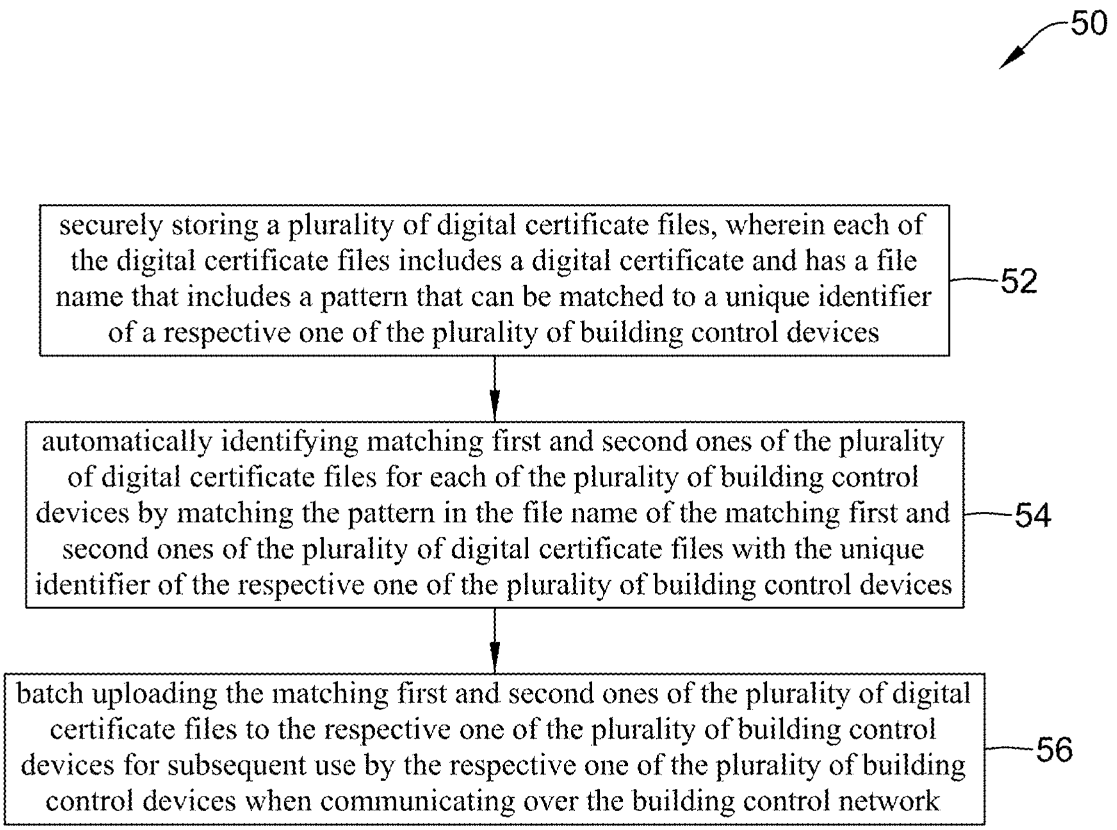
FIG. 4 is a flow diagram showing an illustrative method for performing a batch network configuring of a plurality of building control devices.

FIG. 4 is a block diagram showing an illustrative method 50 for performing a batch network configuration of a plurality of building control devices (such as the building control devices 12). The illustrative method 50 includes securely storing a plurality of digital certificate files (such as the digital certificate files 24), wherein each of the digital certificate files includes a digital certificate and has a file name that includes a pattern that can be matched to a unique identifier (such as the ID 14) of a respective one of the plurality of building control devices, as indicated at block 52. In some instances, the digital certificate includes a user certificate. In some instances, the digital certificate includes a private key. These are just examples. In some instances, the unique identifier of the respective one of the plurality of building control devices may include one or more of a device name, a device serial number, a device instance and a device MAC address. These are also just examples. In some instances, the plurality of digital certificate files may be generated and pre-stored in a directory before automatically identifying a matching one of the plurality of digital certificate files for each of the plurality of building control devices (e.g. before connecting with the building control devices 12).

The illustrative method 50 includes automatically identifying matching first and second ones of the plurality of digital certificate files for each of the plurality of building control devices by matching the pattern in the file name of the matching first and second ones of the plurality of digital certificate files with the unique identifier of the respective one of the plurality of building control devices, as indicated at block 52. The matching first and second ones of the plurality of digital certificate files are batch uploaded to the respective one of the plurality of building control devices for subsequent use by the respective one of the plurality of building control devices when communicating over the building control network, as indicated at block 54. In some instances, the first of the plurality of digital certificate files include a digital certificate that includes a user certificate for the respective building control device, and the second of the plurality of digital certificate files include a digital certificate that includes a private key for the respective building control device.

Figure 5:
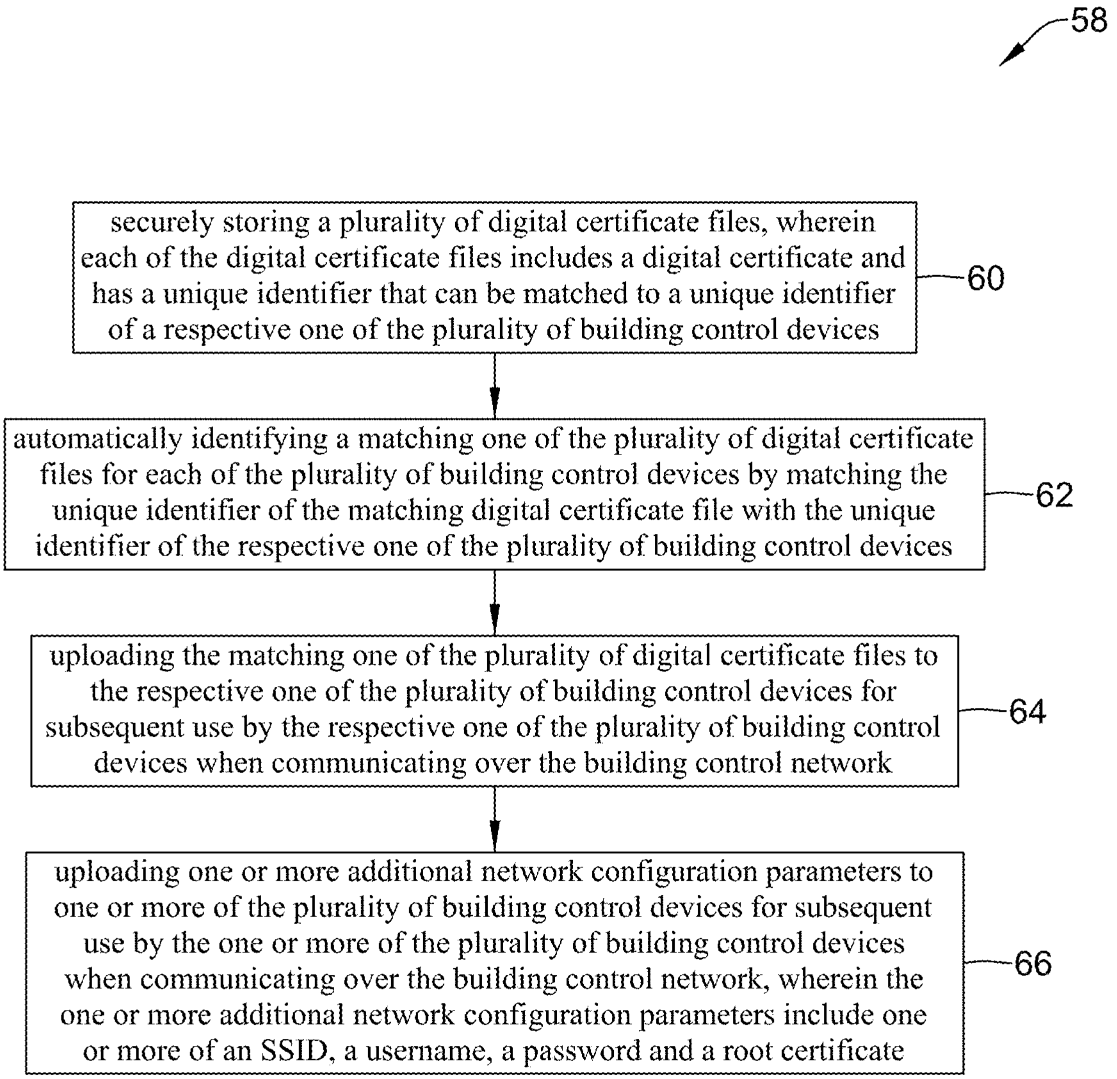
FIG. 5 is a flow diagram showing an illustrative method for performing a batch network configuring of a plurality of building control devices.

FIG. 5 is a flow diagram showing an illustrative method 58 performing a batch network configuration of a plurality of building control devices (such as the building control devices 12). The method 58 includes securely storing a plurality of digital certificate files, wherein each of the digital certificate files includes a digital certificate and has a unique identifier that can be matched to a unique identifier of a respective one of the plurality of building control devices, as indicated at block 60. The unique identifier may be encoded in the file name, and/or may be contained within the file itself (e.g. in the file header, file body, or file footer). A matching one of the plurality of digital certificate files is automatically identified for each of the plurality of building control devices by matching the unique identifier of the matching digital certificate file with the unique identifier of the respective one of the plurality of building control devices, as indicated at block 62. The matching one of the plurality of digital certificate files are uploaded to the respective one of the plurality of building control devices for subsequent use by the respective one of the plurality of building control devices when communicating over the building control network, as indicated at block 64. In some instances, the matching one of the plurality of digital certificate files may be uploaded via the building control network 16 or some other connection. Uploading the matching one of the plurality of digital certificate files may include uploading the entire digital certificate file, or may include just uploading the digital certificate itself contained with the corresponding digital certificate file.

One or more additional network configuration parameters may also be uploaded to one or more of the plurality of building control devices for subsequent use by the one or more of the plurality of building control devices when communicating over the building control network. In some cases, the one or more additional network configuration parameters may include one or more of security type (e.g. WPA2 Enterprise), WiFi SSID name, EAP Type (e.g. TTL), Username, Password, and a root certificate file location, as indicated at block 66.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for performing a batch network configuring of a plurality of building control devices for a building control network, the method comprising:

storing a plurality of digital certificate files, wherein each of the digital certificate files includes a digital certificate and has a file name that includes a pattern that can be matched to a unique identifier of a respective one of the plurality of building control devices;

automatically identifying a matching one of the plurality of digital certificate files for each of the plurality of building control devices by matching the pattern in the file name of the matching digital certificate file with the unique identifier of the respective one of the plurality of building control devices;

batch uploading the matching ones of the plurality of digital certificate files to the respective one of the plurality of building control devices for subsequent use by the respective one of the plurality of building control devices when communicating over the building control network;

performing a factory reset of one of the plurality of building control devices; and once the reset building control device is again up and running, reusing the matching one of the plurality of digital certificate files when communicating over the building control network.

2. The method of claim 1, wherein the digital certificate includes one or more of a user certificate and a private key.

3. The method of claim 1, comprising:

automatically identifying matching first and second ones of the plurality of digital certificate files for each of the plurality of building control devices by matching the pattern in the file name of the matching first and second ones of the plurality of digital certificate files with the unique identifier of the respective one of the plurality of building control devices; and batch uploading the matching first and second ones of the plurality of digital certificate files to the respective one of the plurality of building control devices for subsequent use by the respective one of the plurality of building control devices when communicating over the building control network.

4. The method of claim 1, wherein the unique identifier of the respective one of the plurality of building control devices comprises one or more of a device name, a device serial number, a device instance and a device MAC address.

5. The method of claim 1, wherein the matching pattern in the file name of the matching digital certificate file includes one or more of a device name, a device serial number, a device instance and a device MAC address.

6. The method of claim 1, further comprising:

pre-storing in a directory the plurality of digital certificate files before automatically identifying a matching one of the plurality of digital certificate files for each of the plurality of building control devices; and encrypting the matching one of the plurality of digital certificate files for each of the plurality of building control devices.

7. The method of claim 1, further comprising:

selecting the plurality of building control devices via a user interface before automatically identifying a matching one of the plurality of digital certificate files for each of the plurality of building control devices.

8. The method of claim 7, further comprising:

displaying on the user interface an association between each of the plurality of building control devices and the corresponding matching digital certificate file.

9. The method of claim 1, further comprising:

receiving via a user interface a custom pattern matching expression in a REGEX format, wherein automatically identifying the matching one of the plurality of digital certificate files for each of the plurality of building control devices includes using the custom pattern matching expression to match the pattern in the file name of the matching digital certificate file with the unique identifier of the respective one of the plurality of building control devices.

10. The method of claim 1, further comprising:

receiving additional network configuration parameters via a user interface, and uploading the additional network configuration parameters to one or more of the plurality of building control devices for subsequent use by the one or more of the plurality of building control devices when communicating over the building control network.

11. The method of claim 10, wherein the additional network configuration parameters include one or more of an SSID, a username, a password and a root certificate.

12. The method of claim 11, comprising:

reading back network configuration parameters from one or more of the plurality of building control devices; and storing the network configuration parameters that are read back from the one or more of the plurality of building control devices for archival purposes.

13. The method of claim 1, wherein batch uploading the matching one of the plurality of digital certificate files to the respective one of the plurality of building control devices occurs when the respective one of the plurality of building control devices has an on-line status on the building control network.

14. A method for performing a batch network configuring of a plurality of building control devices for a building control network, the method comprising:

storing a plurality of digital certificate files, wherein each of the digital certificate files includes a digital certificate and has a file name that includes a pattern that can be matched to a unique identifier of a respective one of the plurality of building control devices;

automatically identifying a matching one of the plurality of digital certificate files for each of the plurality of building control devices by matching the pattern in the file name of the matching digital certificate file with the unique identifier of the respective one of the plurality of building control devices;

batch uploading the matching ones of the plurality of digital certificate files to the respective one of the plurality of building control devices for subsequent use by the respective one of the plurality of building control devices when communicating over the building control network;

automatically identifying matching first and second ones of the plurality of digital certificate files for each of the plurality of building control devices by matching the pattern in the file name of the matching first and second ones of the plurality of digital certificate files with the unique identifier of the respective one of the plurality of building control devices; and batch uploading the matching first and second ones of the plurality of digital certificate files to the respective one of the plurality of building control devices for subsequent use by the respective one of the plurality of building control devices when communicating over the building control network;

wherein the first of the plurality of digital certificate files include a digital certificate that includes a user certificate, and the second of the plurality of digital certificate files include a digital certificate that includes a private key.

15. A method for performing a batch network configuring of a plurality of building control devices for a building control network, the method comprising:

storing a plurality of digital certificate files, wherein each of the digital certificate files includes a digital certificate and has a file name that includes a pattern that can be matched to a unique identifier of a respective one of the plurality of building control devices;

automatically identifying a matching one of the plurality of digital certificate files for each of the plurality of building control devices by matching the pattern in the file name of the matching digital certificate file with the unique identifier of the respective one of the plurality of building control devices; and batch uploading the matching ones of the plurality of digital certificate files to the respective one of the plurality of building control devices for subsequent use by the respective one of the plurality of building control devices when communicating over the building control network;

wherein the matching pattern in the file name of the matching digital certificate file includes one or more of a device name, a device serial number, a device instance and a device MAC address; and wherein the file name of the matching digital certificate file includes additional characters that are in addition to the matching pattern, wherein the additional characters identify a type of digital certificate that is included in the matching digital certificate file.

* * * * *